(12) United States Patent
Takeuchi et al.

(10) Patent No.: US 7,406,892 B2
(45) Date of Patent: Aug. 5, 2008

(54) PLASTIC MOLDED GEAR, AND INTERMITTENT ROTATION TRANSMISSION DEVICE AND GEAR TRAIN USING SAME

(75) Inventors: Yoichi Takeuchi, Kawaguchi (JP); Toru Hagihara, Sayama (JP); Toru Takumori, Saitama (JP)

(73) Assignee: Enplas Corporation (JP)

( * ) Notice: Subject to any disclaimer, the term of this patent is extended or adjusted under 35 U.S.C. 154(b) by 697 days.

(21) Appl. No.: 10/931,525

(22) Filed: Aug. 31, 2004

(65) Prior Publication Data

US 2005/0160852 A1    Jul. 28, 2005

(30) Foreign Application Priority Data

Sep. 3, 2003 (JP) ............................. 2003-310978
Jan. 30, 2004 (JP) ............................. 2004-022765
Jun. 29, 2004 (JP) ............................. 2004-191368

(51) Int. Cl.
*F16H 55/18* (2006.01)
(52) U.S. Cl. .................. 74/440; 74/DIG. 10; 74/411; 74/409
(58) Field of Classification Search .............. 74/440, 74/409, DIG. 10, 411, 410, 457, 459.5, 460, 74/461, 462
See application file for complete search history.

(56) References Cited

U.S. PATENT DOCUMENTS

| | | | | |
|---|---|---|---|---|
| 5,181,433 A | * | 1/1993 | Ueno et al. ................... 74/409 |
| 5,870,928 A | * | 2/1999 | Genter et al. ................. 74/440 |
| 5,964,150 A | * | 10/1999 | Kato et al. .................. 101/216 |
| 6,354,395 B1 | * | 3/2002 | Cheng et al. ................ 180/444 |
| 7,128,183 B2 | * | 10/2006 | Saruwatari et al. ........... 180/444 |
| 2005/0160852 A1 | * | 7/2005 | Takeuchi et al. ............. 74/414 |
| 2006/0201271 A1 | * | 9/2006 | Masui ......................... 74/409 |
| 2007/0180943 A1 | * | 8/2007 | Daout ......................... 74/457 |

FOREIGN PATENT DOCUMENTS

JP          2003-90412       3/2003

* cited by examiner

*Primary Examiner*—David M Fenstermacher
(74) *Attorney, Agent, or Firm*—Bachman & LaPointe, P.C.

(57) ABSTRACT

A plastic molded gear capable of reducing teeth knocking noises due to backlash during engagement. A protruding portion 5 for eliminating backlash is formed so as to protrude from both end portions in facewidth directions on one tooth flank 6 of each tooth 2, and the protruding portion 5 is not formed on the other tooth flank 12 of the tooth 2. If the protruding portion 5 is elastically deformed so as to absorb backlash, the protruding portion 5 has the same plane as that of the one tooth flank 6, and the other tooth flank 12 of the tooth 2 serves as a main power transmission surface. With this construction, the protruding portion 5 elastically contacts the tooth flank of a companion gear engaged with the plastic molded gear, so that the elastic deformation of the protruding portion 5 absorbs rotational energy of the companion gear during intermittent rotation. Thus, when gears engaged with each other collide with each other, it is possible to absorb shocks, so that it is possible to reduce teeth knocking noises.

7 Claims, 19 Drawing Sheets

Direction of Main Rotation

Direction of Main Rotation

PLASTIC MOLDED GEAR, AND INTERMITTENT ROTATION TRANSMISSION DEVICE AND GEAR TRAIN USING SAME

BACKGROUND OF THE INVENTION

1. Field of the Invention

The present invention relates to a plastic molded gear, a gear train using the plastic molded gear, and an intermittent rotation transmission device, such as a paper feeding mechanism for an ink jet printer, which uses the plastic molded gear.

2. Description of the Prior Art

In comparison with metal gears, plastic molded gears are light and low noise gears, and can be used without any lubricants since they have self-lubricating properties. In addition, the mass-productivity of plastic molded gears is higher than that of metal gears, so that the production costs for plastic molded gears can be lower than those of metal gears. For that reason, in recent years, plastic molded gears are widely used for gear trains for ink jet printers, and gear trains for automotive power transmission parts and precision instruments.

Of such plastic molded gears, in plastic molded gears used for intermittent rotation transmission devices for transmitting power while frequently repeating rotation and stopping, one of teeth meshing with each other during stopping and starting collides with the other tooth, so that there are discrepancies that teeth knocking noises are produced.

Therefore, there are proposed various plastic molded gears which are devised so as to prevent teeth knocking noises during power transmission.

As a first conventional example, a gear 50 shown in FIGS. 20A and 20B has fillet portions 52, which are formed on both tooth flanks on one end side in facewidth directions of each tooth 51 and which are designed to contact a companion gear meshing with the gear 50 to be deformed to absorb shocks when the gear 50 meshes with the companion gear (see Japanese Utility Model Laid-Open No. 55-100745).

As a second conventional example, a gear 53 shown in FIGS. 21A and 21B has slits 56, each of which is formed on the side of a tooth flank 55 meshing with a companion gear 54 so as to extend along the tooth flank 55 and so as to pass through each tooth in facewidth directions, and each of which allows the tooth flank 55 meshing with the companion gear 54 to be elastically deformed to absorb shocks when the tooth flank 55 meshes with the companion gear 54 (see Japanese Utility Model Laid-Open No. 58-127246).

As a third conventional example, a gear 57 shown in FIG. 22 has through holes 60, each of which passes through each tooth 58 in facewidth directions, and each of which allows the whole tooth 58 to be easily elastically deformed to absorb shocks when the gear 57 meshes with a companion gear (see Japanese Utility Model Laid-Open No. 55-98849).

As a fourth conventional example, a gear 61 shown in FIG. 23 has slits 63, each of which is formed in each tooth 62 so as to extend in facewidth directions over the entire facewidth and so as to extend from a tooth crest 64 to pass through a bottom land 65, and each of which allows the tooth 62 to be easily elastically deformed to shocks when the gear 61 meshes with a companion gear (see Japanese Utility Model Laid-Open No. 55-98850).

As a fifth conventional example, a gear 66 shown in FIG. 24 has visco-elastic bodies 70, each of which protrudes from both tooth flanks 68 of each tooth 67 in a central portion in facewidth directions, and each of which is designed to contact a tooth flank of a companion gear to absorb shocks when the gear 66 meshes with the companion gear (see Japanese Patent Laid-Open No. 2001-221322).

As a sixth conventional example, a gear 71 shown in FIG. 25 and proposed by the inventor of the present application has cavity portions 73, which are formed in both end portions in facewidth directions of each tooth 72, and elastically deformable expanded protruding portions 74 which are formed on both end portions in facewidth directions of each tooth 72 by the difference in shrinkage after injection molding between both end portions having the cavity portions 73 in facewidth directions and other portions. The expanded protruding portions 74 are designed to be elastically deformed to absorb shocks when the gear 71 meshes with a companion gear (see Japanese Patent Laid-Open No. 2003-90412).

However, in the first conventional example, the fillet portions 52 are formed on only one end side in facewidth directions, and thin walled portions and cavity portions capable of absorbing deformation of the fillet portions 52 are not formed. Therefore, the surface pressure applied on the fillet portions 52 is too large, so that the fillet portions 52 are early worn. Thus, there is the possibility that, when the gear meshes with a companion gear, it is not possible to obtain shock absorbing effects for a long period of time, so that it is not possible to stably obtain teeth knocking noise absorbing effects for a long period of time.

In the second conventional example, since the tooth flank 55 meshing with a companion gear during power transmission is elastically deformed over the whole region in facewidth directions, the amount of elastic deformation varies in accordance with load during power transmission, so that the angle of rotation per tooth is easy to vary. Therefore, it is difficult for the gear 53 to be used for a gear train for precisely transmitting rotation.

In the third and fourth conventional examples, since the whole teeth 58 and 62 are easily deformed, the amount of elastic deformation of the teeth 58 and 62 varies in accordance with load during power transmission similar to the second conventional example, so that the angle of rotation per tooth is easy to vary. Therefore, it is difficult for the gears 57 and 61 to be used for a gear train for precisely transmitting rotation.

In the fifth conventional example, although the visco-elastic bodies 70 protruding from the tooth flanks 68 are compressed to be deformed by load during power transmission, the amount of deformation thereof varies in accordance with the load during power transmission. Therefore, similar to the second through fourth conventional examples, it is difficult for the gear 66 to be used for a gear train for precisely transmitting rotation.

In the sixth conventional example, if the expanded protruding portions 74 are elastically deformed, the tooth flank 75 except for the expanded protruding portions 74 contacts the tooth flank of a companion gear to transmit power. Therefore, it is possible to more precisely transmit rotation than the gear in the second through fifth conventional examples. In addition, since the expanded protruding portions 74 are formed on both end portions in facewidth directions, it is possible to decrease the surface pressure when the gear 71 meshes with the companion gear, and it is difficult to cause the early wearing of the teeth 72 unlike the first conventional example. However, since the expanded protruding portions 74 are formed on the basis of the difference in shrinkage after injection molding, the amount of expanded protrusion is small, so that it is not possible to cause the expanded protruding portions 74 to protrude from the tooth flanks 75 to such an extent that it is possible to sufficiently absorb backlash.

SUMMARY OF THE INVENTION

It is therefore an object of the present invention to eliminate the aforementioned problems and to provide a plastic molded gear capable of reducing teeth knocking noises due to backlash when the gear meshes with a companion gear, an intermittent rotation transmission device having the plastic molded gear, and a gear train having the plastic molded gear.

In order to accomplish the aforementioned and other objects, according to one aspect of the present invention, a plastic molded gear comprises: a gear body; a plurality of teeth formed on an outer periphery of the gear body, each of the plurality of teeth having a pair of tooth flanks on both sides thereof; an elastically deformable protruding portion for eliminating backlash, the protruding portion being formed on one of the pair of tooth flanks so as to protrude from an end portion in facewidth directions of each of the plurality of teeth, the protruding portion having the same plane as that of the one of the pair of tooth flanks when the protruding portion is elastically deformed so as to absorb backlash, wherein the other tooth flank of the pair of tooth flanks serves as a main power transmission surface without having the same protruding portion as the protruding portion.

According to another aspect of the present invention, a plastic molded gear comprises: a gear body; a plurality of teeth formed on an outer periphery of the gear body, each of the plurality of teeth having a pair of tooth flanks on both sides thereof; a pair of elastically deformable protruding portions for eliminating backlash, the pair of protruding portions being formed on both of the pair of tooth flanks so as to protrude from an end portion in facewidth directions of each of the plurality of teeth, respectively; and a cavity portion, formed in the end portion in facewidth directions, for receiving the pair of protruding portions so as to arrange a corresponding one of the pair of protruding portions on the same plane as that of a corresponding one of the pair of tooth flanks when the corresponding one of the pair of protruding portions is elastically deformed so as to absorb backlash. In this case, the cavity portion may be open on the side of a tooth crest of each of the plurality of teeth.

According to another aspect of the present invention, a plastic molded gear comprises: a gear body; a plurality of teeth formed on an outer periphery of the gear body, each of the plurality of teeth having a pair of tooth flanks on both sides thereof; an elastically deformable protruding portion for eliminating backlash, the protruding portion being integrally formed on at least one end face of end portions in facewidth directions of each of the plurality of teeth so as to protrude from one of the pair of tooth flanks of each of the plurality of teeth toward an adjacent one of the plurality of teeth, the protruding portion having the same plane as that of the one of the pair of tooth flanks when the protruding portion is elastically deformed so as to absorb backlash, wherein the other tooth flank of the pair of tooth flanks serves as a main power transmission surface.

According to another aspect of the present invention, a plastic molded gear comprises: a gear body; a plurality of teeth formed on an outer periphery of the gear body, each of the plurality of teeth having a pair of tooth flanks on both sides thereof; a first elastically deformable protruding portion for eliminating backlash, the first protruding portion being integrally formed on one end face of end portions in facewidth directions of each of the plurality of teeth so as to protrude from one of the pair of tooth flanks of each of the plurality of teeth toward an adjacent one of the plurality of teeth; and a second elastically deformable protruding portion for eliminating backlash, the second protruding portion being integrally formed on the other end face of the end portions in facewidth directions of each of the plurality of teeth so as to protrude from the other tooth flank of the pair of tooth flanks of each of the plurality of teeth toward an adjacent one of the plurality of teeth, wherein one of the first and second protruding portions has the same plane as that of the one of the pair of tooth flanks or the other tooth flank when the one of the first and second protruding portions is elastically deformed so as to absorb backlash.

According to a further aspect of the present invention, there is provided an intermittent rotation transmission device for intermittently transmitting rotation at one direction, wherein a gear train for intermittently transmitting rotation uses any one of the above described plastic molded gear.

According to a still further aspect of the present invention, there is provided a gear train for transmitting rotation of a driving gear to a driven gear via an idle gear, the gear train comprising: a driving gear; a driven gear; and an idle gear for transmitting rotation of the driving gear to the driven gear, the idle gear being the above described plastic molded gear having the first and second protruding portions, each of the first and second protruding portions of the plastic molded gear being arranged so as to face a tooth flank opposite to a tooth flank serving as a main power transmission surface of the driving gear when the driving gear is rotated in one direction, the plastic molded gear being shifted by a first predetermined dimension with respect to the driving gear in a facewidth direction, the driven gear being shifted by a second predetermined dimension with respect to the plastic molded gear in the same direction as the facewidth direction, and the first and second predetermined dimensions being equal to or greater than a dimension of the protruding portion in facewidth directions.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENTS

Referring now to the accompanying drawings, the preferred embodiments of the present invention will be described below in detail.

First Preferred Embodiment

Figure 1:
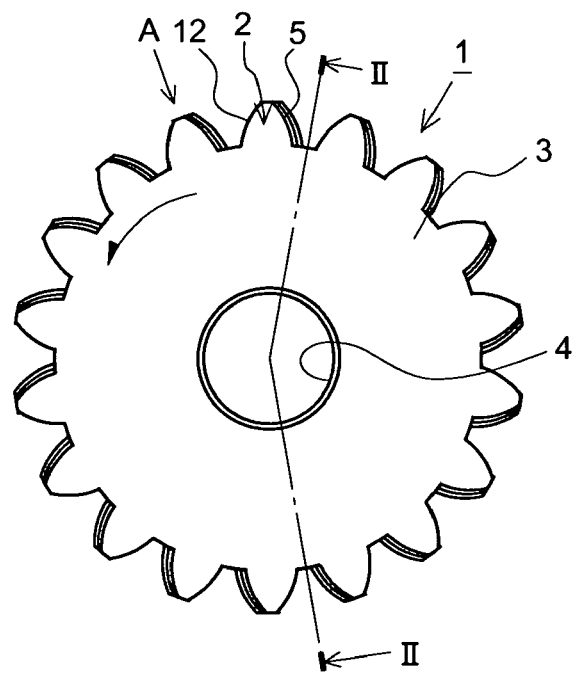
FIG. 1 is a front view of the first preferred embodiment of a plastic molded gear according to the present invention.
Figure 2:
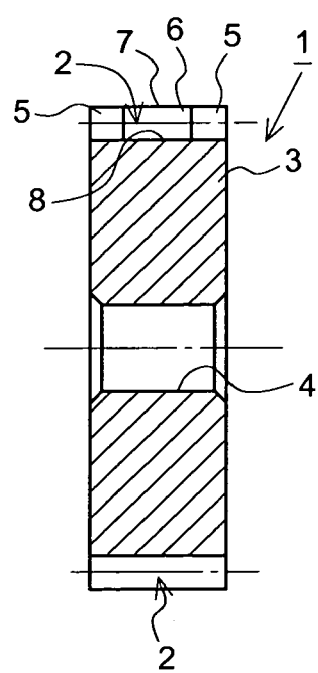
FIG. 2 is a sectional view taken along line II-II of FIG. 1.
Figure 3:
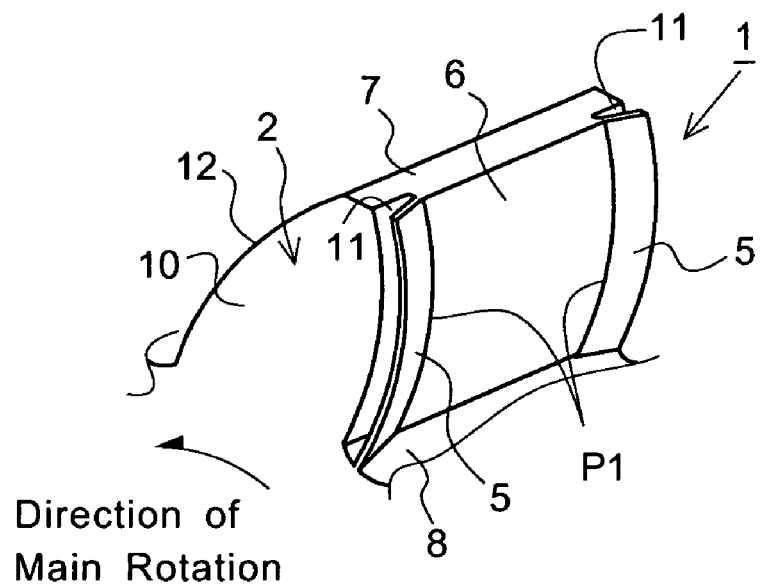
FIG. 3 is an enlarged perspective view of a tooth of the plastic molded gear of FIG. 1.
Figure 4:
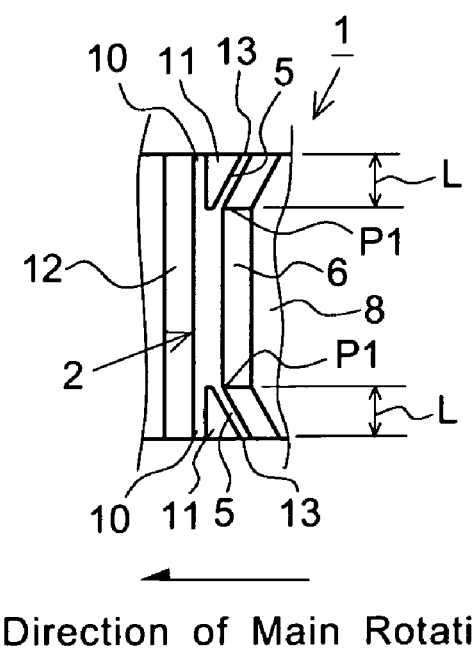
FIG. 4 is an enlarged plan view of a tooth of the plastic molded gear of FIG. 1.

FIGS. 1 through 4 show the first preferred embodiment of a plastic molded gear according to the present invention. FIG. 1 is a front view of a plastic molded gear 1 in this preferred embodiment, and FIG. 2 is a sectional view taken along line II-II of FIG. 1. FIG. 3 is a perspective view of a tooth 2 of the plastic molded gear 1 of FIG. 1, and FIG. 4 is a plan view of the tooth 2, which is viewed in a direction of arrow A of FIG. 1.

In these figures, the plastic molded gear 1 in this preferred embodiment is a spur gear which is formed by injection-molding a resin material, such as polyacetal, polyamide, polyphenylene sulfide or polybutylene terephthalate. The plastic molded gear 1 has a plurality of teeth 2 on the outer periphery of a substantially disk-shaped web 3 which has an axial hole 4 at the central portion thereof.

The plastic molded gear 1 has thin protruding portions 5 which protrude from both end portions in facewidth directions of each of the teeth 2. That is, in the plastic molded gear 1, the protruding portions 5, each of which extends from a tooth crest 7 toward a bottom land 8 so as to have a substantially constant thickness, protrude from both end portions in facewidth directions of each of the teeth 2 on the side of one of tooth flanks 6, and the amount of protrusion of each of the protruding portions 5 gradually increases as a distance from a corresponding one of both end portions in facewidth directions decreases.

Each of the protruding portions 5 formed on one of the tooth flanks 6 of each of the teeth 2 protrudes toward an adjacent tooth by the substantially same dimension as that of at least backlash which is set between the gear 1 and a companion gear to mesh with the gear 1. Each of the protruding portions 5 is separated from another portion 10 of each of the teeth 2 by a slit 11. The slit 11 has such a depth in facewidth directions as to substantially correspond to a raising position P1 of each of the protruding portions 5, and extends along one of the tooth flanks 6 from the tooth crest 7 to the bottom land 8. If the slit 11 is thus formed so as to extend along each of the protruding portions 5, when the protruding portion 5 is pressed on the tooth flank of the companion gear to be deformed, the protruding portion 5 thus deformed is housed in a space of the slit 11, so that the protruding portion 5 does not preclude tooth flanks from contacting each other.

That is, in the plastic molded gear 1 in this preferred embodiment, the other tooth flank 12 (i.e., the tooth flank having no protruding portions 5) of each of the teeth 2 serves as a main power transmission surface for contacting the tooth flank of the companion gear to transmit power. When the gear 1 reversely rotates to transmit rotation, if the protruding portion 5 is pressed on a tooth of the companion gear to be deformed, the protruding portion 5 thus deformed is received in the slit 11 to allow the tooth flanks having a large rigidity to contact each other without protruding outwardly from one of the tooth flanks 6. Thus, it is possible to precisely transmit rotation even if the gear 1 reversely rotates.

The optimum dimension L from an edge 13 of the protruding portion 5 in facewidth directions to the raising position P1 is determined on the basis of the dimension of the facewidth of the gear 1, the thickness of the protruding portion 5 and so forth. For example, if the thickness of the protruding portion 5 is about 0.2 mm in a gear having a module of about 0.5 to 2.0 mm, the optimum dimension L is determined to be about one-sixth to one-fourth the dimension of the facewidth. Furthermore, the depth of the slit 11 is substantially equal to the dimension L of the protruding portion 5.

In the above described plastic molded gear 1, the protruding portion 5 can absorb backlash, and the protruding portion 5 is designed to elastically contact the tooth flank of the companion gear meshing with the gear 1. Therefore, if the companion gear remains rotating due to inertia after the gear 1 stops rotating, the protruding portion 5 is elastically deformed to absorb the rotational energy of the companion gear to absorb shocks when the tooth flanks meshing with each other collide with each other. Thus, it is possible to reduce teeth knocking noises.

In the plastic molded gear 1 in this preferred embodiment, the protruding portion 5 can absorb backlash, and the elastic deformation force, which is produced by contact of the protruding portion 5 with the companion gear meshing with the gear 1, causes the other tooth flank (the main power transmission surface) 12 to always contact the tooth flank of the companion gear meshing with the gear 1. Therefore, when the gear 1 starts to rotate, it is possible to precisely and smoothly transmit rotation without causing rotation lag.

While the protruding portions 5 have been formed on both end portions in facewidth directions of each of the teeth 2 in the plastic molded gear 1 in this preferred embodiment, the protruding portion 5 may be formed on only one end portion in facewidth directions of each of the teeth 2.

Figure 5:
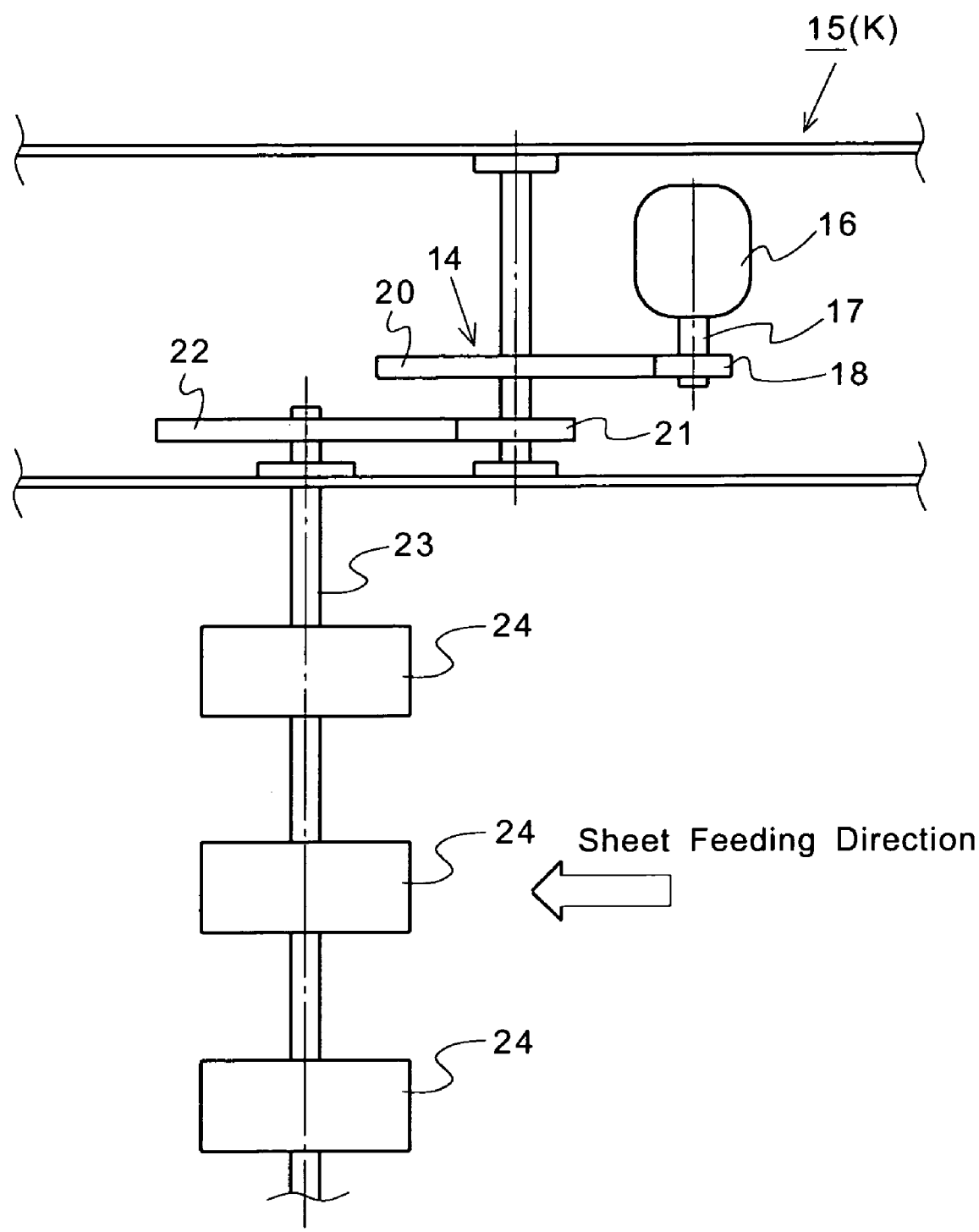
FIG. 5 is a schematic view of an intermittent rotation transmission device using a plastic molded gear according to the present invention.
Figure 6A:
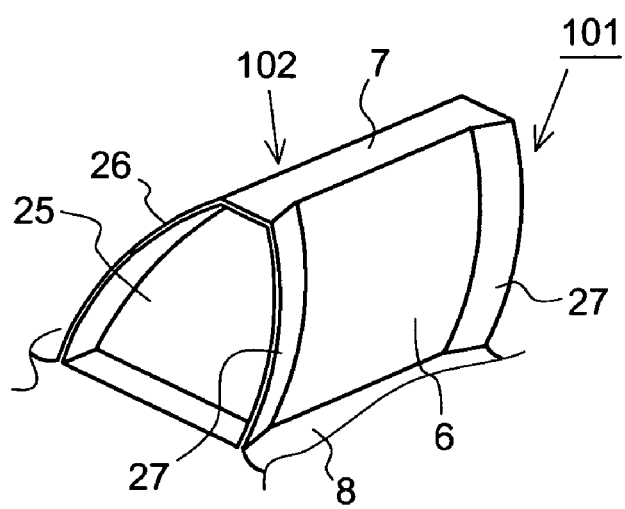
FIG. 6A is an enlarged perspective view of a tooth of the second preferred embodiment of a plastic molded gear according to the present invention.
Figure 6B:
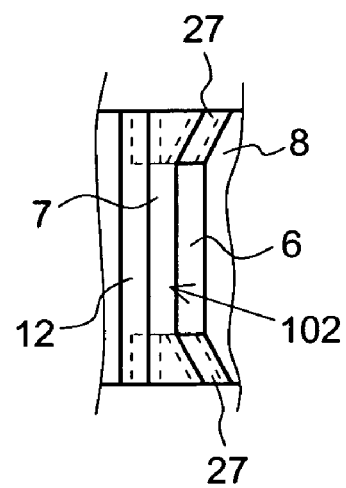
FIG. 6B is an enlarged plan view of the tooth of FIG. 6A.
Figure 7B:
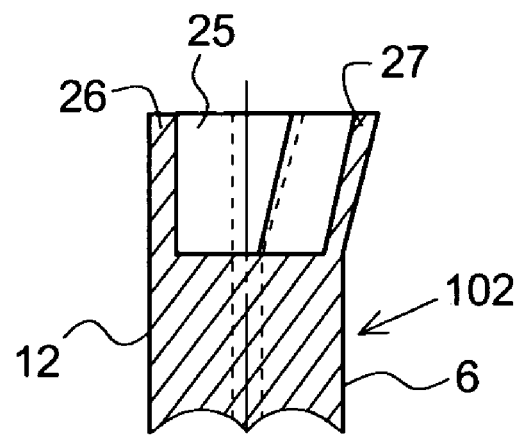
FIG. 7B is a sectional view of part of a tooth taken along line VIIB-VIIB of FIG. 7A.
Figure 7A:
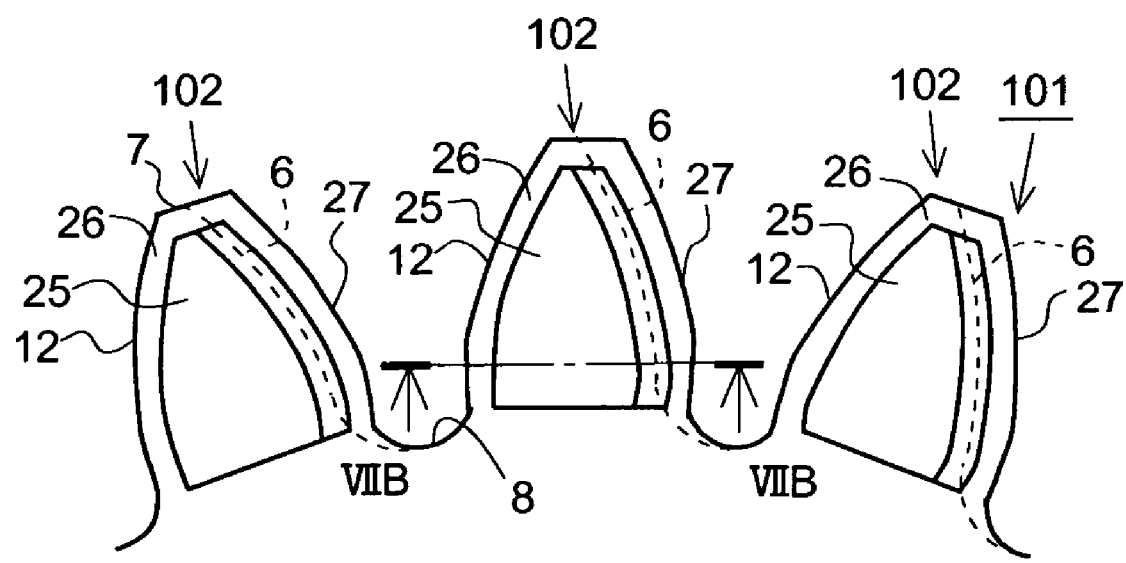
FIG. 7A is an enlarged front view of part of the second preferred embodiment of a plastic molded gear according to the present invention.

FIG. 5 shows an intermittent rotation transmission device 15 using the plastic molded gear 1 in this preferred embodiment as part of a gear train 14.

The intermittent rotation transmission device 15 shown in FIG. 5 is used for, e.g., a paper feeding mechanism K of an ink jet printer, and is designed to frequently repeat rotation and stopping. The intermittent rotation transmission device 15 comprises a motor 16, and a gear train 14 for transmitting rotation of the motor 16. The gear train 14 comprises at least an output gear 18 fixed to a rotation shaft 17 of the motor 16, an idle gear 20 meshing with the output gear 18, an idle gear 21 rotating with the idle gear 20, and a roller shaft driving gear 22 meshing with the idle gear 21.

The intermittent rotation transmission device 15 is designed to repeat rotation and stopping of the motor 16 to transmit rotation of the motor 16 to a paper feeding roller shaft 23 via the output gear 18, idle gears 20, 21 and roller shaft driving gear 22, to rotate a paper feeding roller 24, which rotates with the paper feeding roller shaft 23, in accordance with rotation of the motor 16 to intermittently feed a sheet (a sheet-like recording material, such as a copy paper or a plastic film) in a sheet feeding direction. Then, a jet-type printing part is designed to form (print) an image on the sheet which is fed by the intermittent rotation transmission device 15. For example, it is considered that the plastic molded gear 1 in this preferred embodiment is used as the idle gear 20 and the roller shaft driving gear 22. The present invention should not be limited thereto. If the plastic molded gear 1 is used as one of gears meshing with each other, it is possible to reduce teeth knocking noises, and it is possible to quietly and precisely transmit rotation.

Second Preferred Embodiment

FIGS. 6A, 6B, 7A and 7B show a tooth 102 of the second preferred embodiment of a plastic molded gear 101 according to the present invention as an example of a tooth having a different shape as that of the tooth 2 in the above described first preferred embodiment.

As shown in these figures, the plastic molded gear 101 has cavity portions 25 on both end portions in facewidth directions thereof, and thin portions 26 surrounding the cavity portions 25. The thin portions 26 on the side of one of tooth flanks 6 protrude toward an adjacent tooth 102 to form thin protruding portions 27.

Similar to the above described first preferred embodiment, the thin protruding portions 27, each of which extends from a tooth crest 7 toward a bottom land 8 so as to have a substantially constant thickness, protrude from both end portions in facewidth directions of each of the teeth 102 on the side of one of tooth flanks 6, and the amount of protrusion of the protruding portions 27 gradually increases as a distance from a corresponding one of both end portions in facewidth directions decreases.

The plastic molded gear 101 with such a construction can also obtain the same operations and effects as those in the above described first preferred embodiment.

The depth of each of the cavity portions 25 is equal to that of the slit 11 in the above described first preferred embodiment, and the thickness of each of the protruding portions 27 is equal to that of the protruding portion 5 in the above described first preferred embodiment.

While the protruding portions 27 have been formed on both end portions in facewidth directions of each of the teeth 102 in this preferred embodiment, the present invention should not be limited thereto, but the protruding portion 27 may be formed on only one end portion in facewidth directions of each of the teeth 102.

Third Preferred Embodiment

Figure 8A:
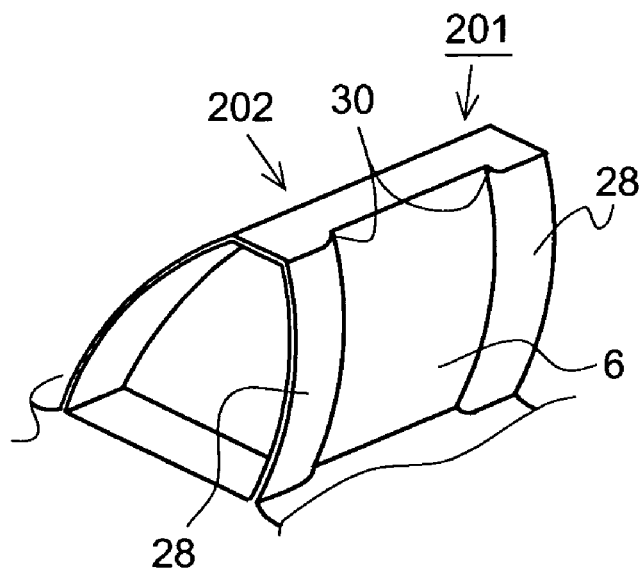
FIG. 8A is an enlarged perspective view showing an example of a tooth of the third preferred embodiment of a plastic molded gear according to the present invention as a first modified example of the second preferred embodiment.
Figure 8B:
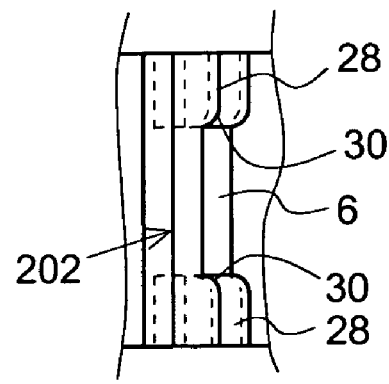
FIG. 8B is an enlarged plan view of the tooth of FIG. 8A.
Figure 9A:
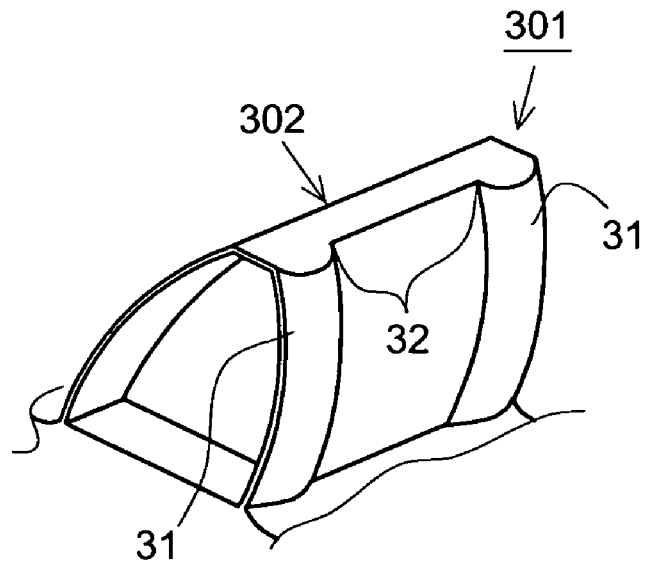
FIG. 9A is an enlarged perspective view showing an example of a tooth of the third preferred embodiment of a plastic molded gear according to the present invention as a second modified example of the second preferred embodiment.
Figure 9B:
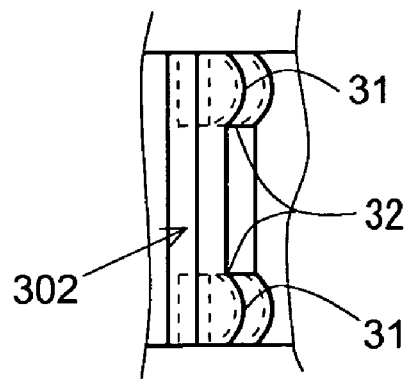
FIG. 9B is an enlarged plan view of the tooth of FIG. 9A.

FIGS. 8A, 8B, 9A and 9B show modified examples of the tooth 2 in the above described second preferred embodiment. FIGS. 8A and 8B show a first modified example of the tooth 102 in the above described second preferred embodiment, and FIGS. 9A and 9B show a second modified example of the tooth 102 in the above described second preferred embodiment.

In the first modified example shown in FIGS. 8A and 8B, most of each of thin protruding portions 28 is formed so as to be substantially in parallel to one of tooth flanks 6, and each of the protruding portions 28 is connected to the one of the tooth flanks 6 by a curved surface 30. A wider area of each of the protruding portions 28 than that of each of the protruding portions 27 in the above described second preferred embodiment is designed to contact the tooth flank of a companion gear to absorb backlash.

In the second modified example shown in FIGS. 9A and 9B, each of thin protruding portions 31 has a substantially circular-arc planar shape, so that the circular-arc-shaped top portion first contacts the tooth flank of a companion gear. Furthermore, in comparison with the protruding portions 27 in the second preferred embodiment, the contact position of each of the protruding portions 31 in the second modified example with the tooth flank of the companion gear is nearer to a corresponding one of base portions 32, so that the flow stress is greater than that in the second preferred embodiment.

The plastic molded gears 201, 301 having teeth 202, 302 shown in FIGS. 8A, 8B, 9A and 9B can also obtain the same operations and effects as those in the above described first preferred embodiment.

Fourth Preferred Embodiment

FIG. 10 shows the shape of a tooth 402 of the fourth preferred embodiment of a plastic molded gear 401 according to the present invention. As shown in FIG. 10, in this preferred embodiment, thin protruding portions 33 are formed on both of tooth flanks 6 and 12. That is, the same protruding portions 33 as the protruding portions 27 on one tooth flank 6 in the second preferred embodiment are also formed on the other tooth flank 12.

In the plastic molded gear 401 in this preferred embodiment, the protruding portions 33 and 33 on both of the tooth flanks 6 and 12 are designed to absorb backlash, so that the amount of protrusion of each of the protruding portions 33 can be half the amount of protrusion of each of the protruding portions 27 in the second preferred embodiment. Also with such a construction, the elastic deformation of the protruding portions 33 and 33 can absorb shocks when teeth meshing with each other collide with each other. Thus, it is possible to reduce teeth knocking noises, and it is possible to quietly and precisely transmit rotation similar to the above described first preferred embodiment.

In the plastic molded gear 401 in this preferred embodiment, during power transmission, after the thin protruding portions 33 are elastically deformed, the protruding portions 33 have the same plane as that of any one of the tooth flanks 6 and 12 having a large rigidity, so that any one of the tooth flanks 6 and 12 having the large rigidity contacts the tooth flank of a companion gear meshing with the gear 401 to transmit rotation. Therefore, it is possible to more precisely transmit rotation than the second through fourth conventional examples wherein the whole tooth flank or the whole tooth is elastically deformed.

In the plastic molded gear 401 in this preferred embodiment, if the thin protruding portion 33 is pressed on the tooth of the companion gear, the protruding portion 33 is elastically deformed to be received in a cavity portion 34 without protruding from the one tooth flank 6 or the other tooth flank 12, so that one end portion in facewidth directions is early worn unlike the first conventional example. Therefore, for a long period of time, it is possible to prevent teeth knocking noises due to backlash, and it is possible to precisely transmit rotation.

Furthermore, if the plastic molded gear 401 in this preferred embodiment is used for transmitting rotation in forward and reverse directions, one of the tooth flanks 6 and 12 of each of the teeth 402 serves as a main power transmission surface in accordance with the direction of rotation.

While the protruding portions 33 have been formed on both end portions in facewidth directions of each of the teeth 402 in the plastic molded gear 401 in this preferred embodiment, the present invention should not be limited thereto, but the protruding portion 33 may be formed on only one end portion in facewidth directions.

Fifth Preferred Embodiment

Figure 10A:
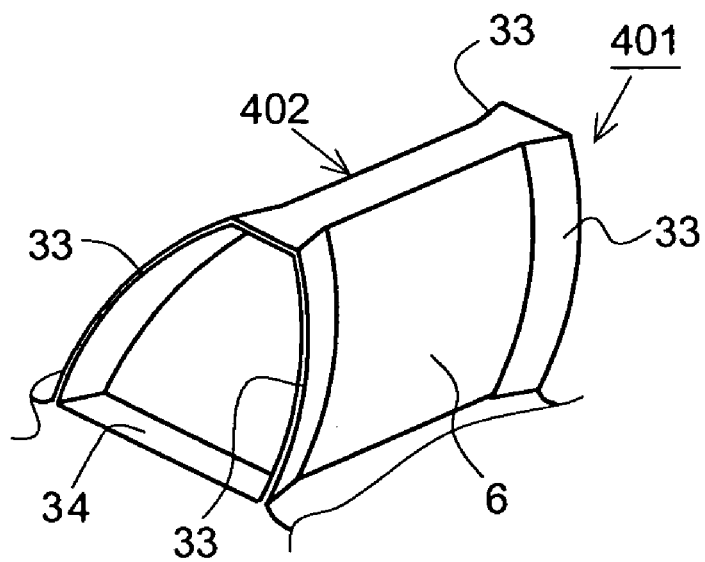
FIG. 10A is an enlarged perspective view of a tooth of the fourth preferred embodiment of a plastic molded gear according to the present invention.
Figure 10B:
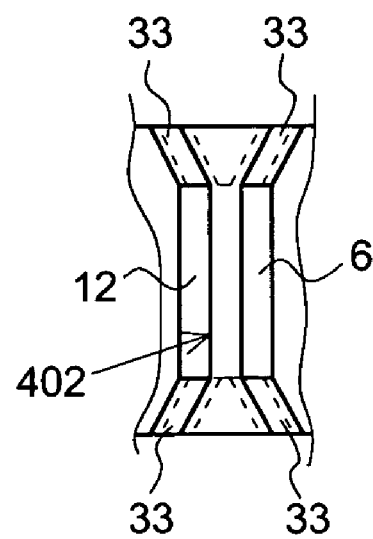
FIG. 10B is an enlarged plan view of the tooth of FIG. 10A.
Figure 11:
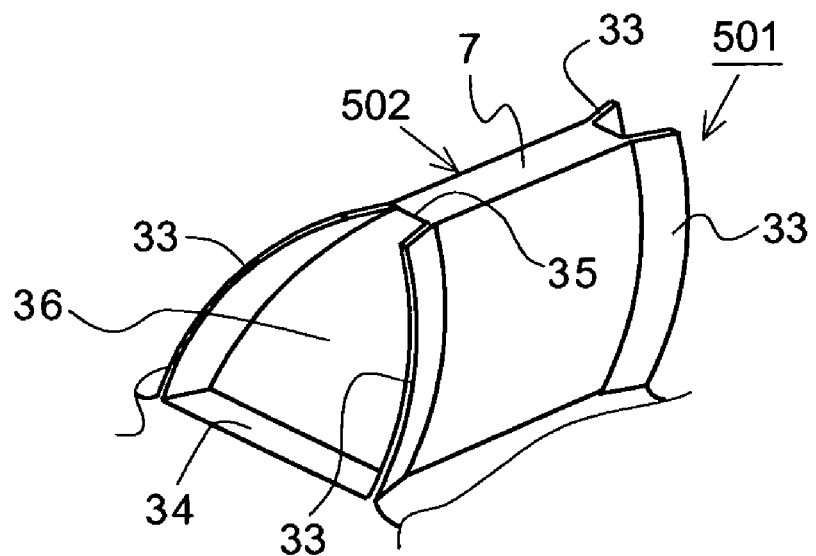
FIG. 11 is a perspective view of a tooth of the fifth preferred embodiment of a plastic molded gear according to the present invention.
Figure 12:
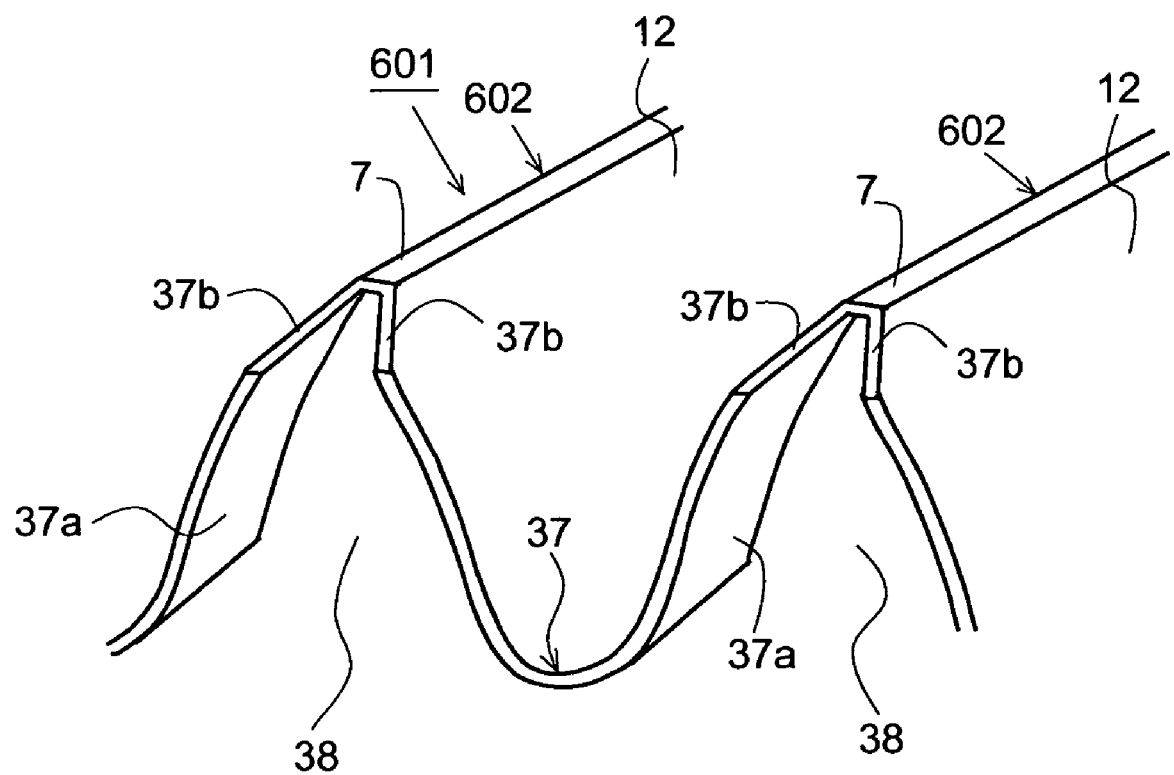
FIG. 12 is a perspective view of teeth of the sixth preferred embodiment of a plastic molded gear according to the present invention.
Figure 13B:
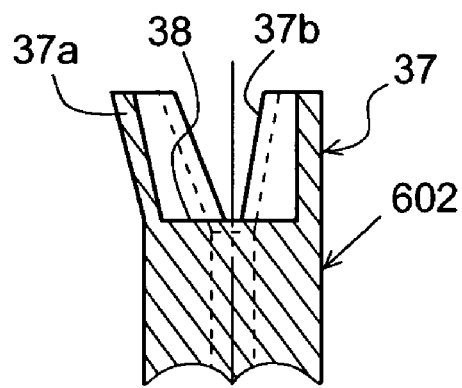
FIG. 13B is a sectional view of the tooth taken along line XIIIB-XIIIB of FIG. 13A.
Figure 13C:
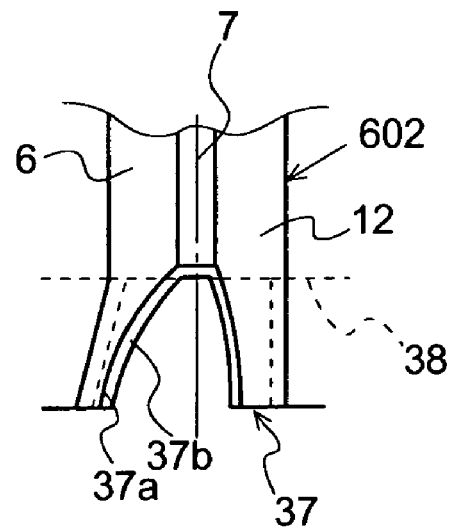
FIG. 13C is a plan view of the tooth of FIG. 13A.
Figure 13A:
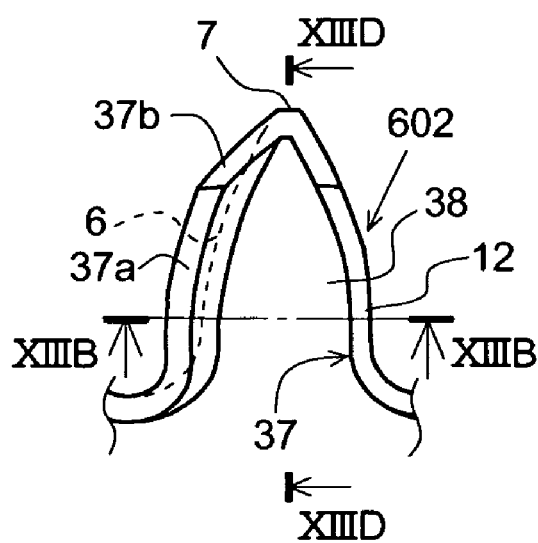
FIG. 13A is a front view of a tooth of the sixth preferred embodiment of a plastic molded gear according to the present invention.
Figure 13D:
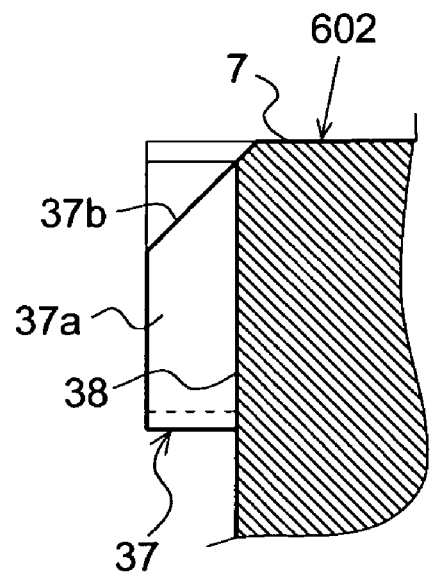
FIG. 13D is a sectional view of the tooth taken along line XIIID-XIIID of FIG. 13A.
Figure 14:
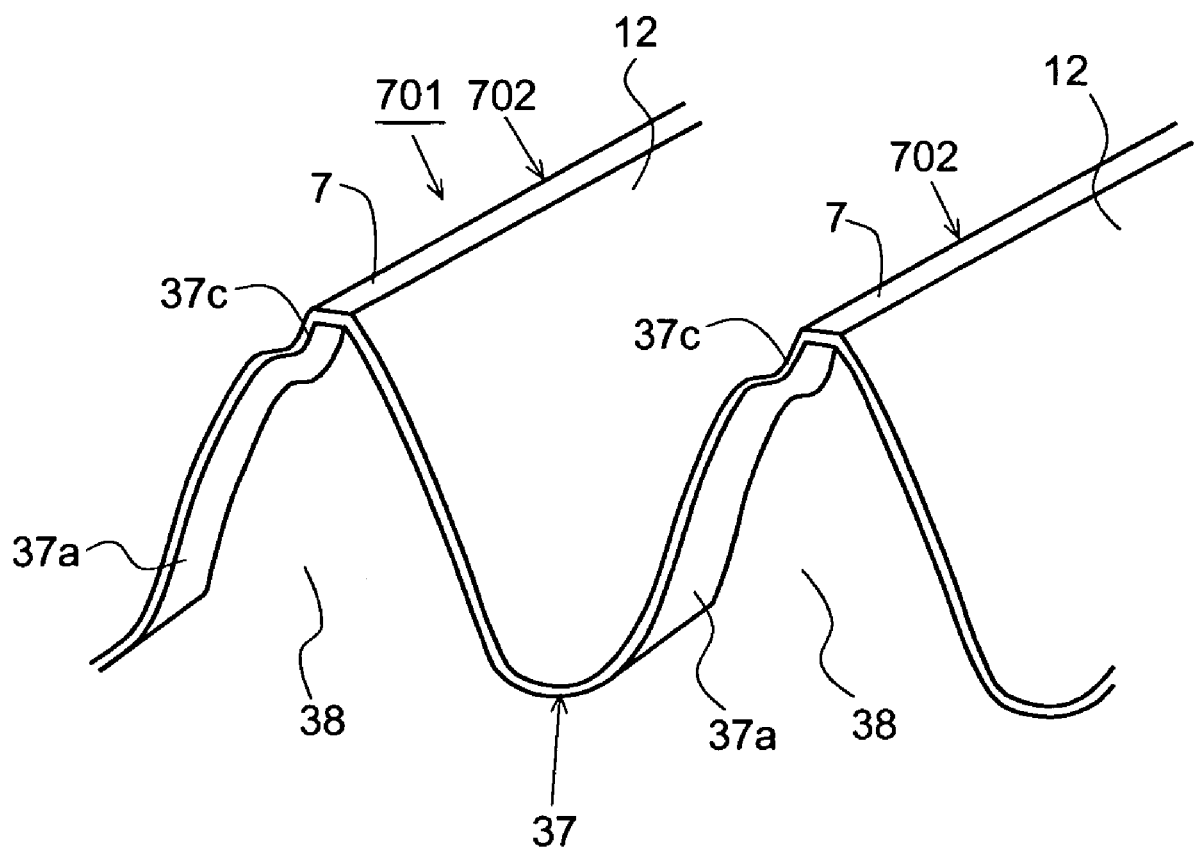
FIG. 14 is a perspective view of teeth of the seventh preferred embodiment of a plastic molded gear according to the present invention.
Figure 15B:
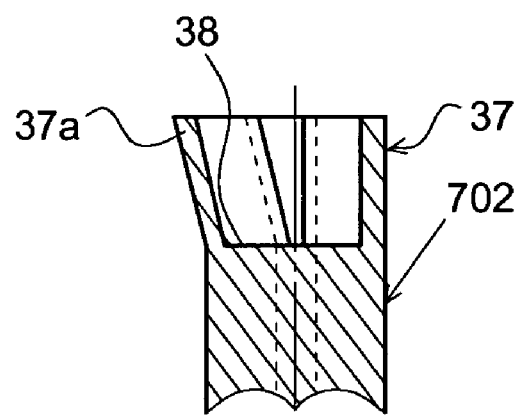
FIG. 15B is a sectional view of the tooth taken along line XVB-XVB of FIG. 15A.
Figure 15C:
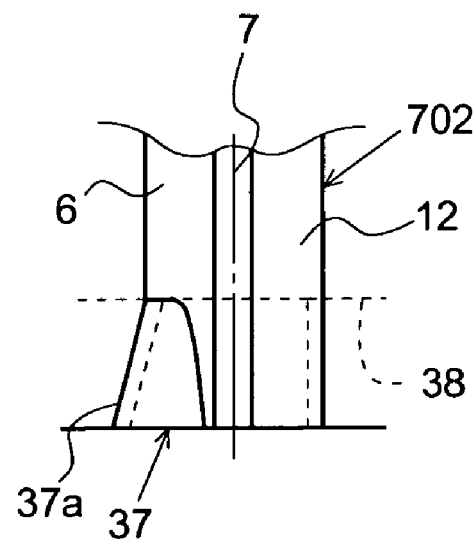
FIG. 15C is a plan view of the tooth of FIG. 15A.
Figure 15A:
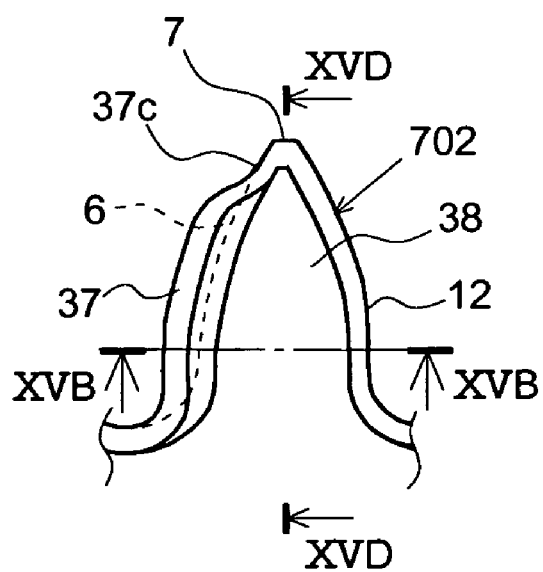
FIG. 15A is a front view of a tooth of the seventh preferred embodiment of a plastic molded gear according to the present invention.
Figure 15D:
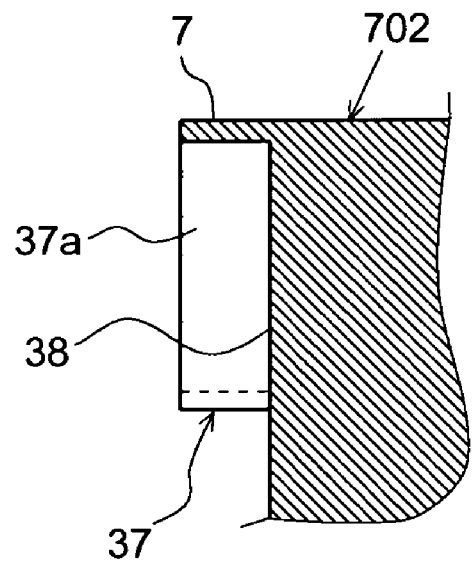
FIG. 15D is a sectional view of the tooth taken along line XVD-XVD of FIG. 15A.

FIG. 11 shows the shape of a tooth 502 of the fifth preferred embodiment of a plastic molded gear 501 according to the present invention as a modified example of the shape of the tooth 402 shown in FIG. 10. That is, as shown in FIG. 11, in the plastic molded gear 501 in this preferred embodiment, cavity portions 34 are open on the side of a tooth crest 7. Thus, air in the cavity portions 34 is easy to escape to the outside of the cavity portions 34, so that it is possible to reduce noises due to the elastic deformation of protruding portions 33.

Furthermore, this preferred embodiment may be applied to the plastic molded gears 101, 201 and 301 in the preferred embodiments shown in FIGS. 6A, 6B, 8A, 8B, 9A and 9B to cause the cavity portions 25 to be open on the side of the tooth crest 7.

While the tooth crest side opening portion 35 of each of the cavity portions 34 has been formed to a side bottom portion 36 in facewidth directions in this preferred embodiment, the present invention should not be limited thereto, but the tooth crest side opening portion 35 may be formed to a position between the end portion in facewidth directions and the side bottom portion 36 in facewidth directions.

Sixth Preferred Embodiment

FIG. 12 and FIGS. 13A through 13D show the shape of a tooth 602 of the sixth preferred embodiment of a plastic molded gear 601 according to the present invention as a modified example of the shape of the tooth 502 shown in FIG. 11. That is, as shown in FIG. 12 and FIGS. 13A through 13D, in the plastic molded gear 601 in this preferred embodiment, a thin portion 37 having a substantially constant thickness is continuously formed so as to extend along the periphery of the tooth 602 on the side of one of end faces 38 in facewidth directions, and a protruding portion 37a is formed by protruding the thin portion 37 on the side of one of tooth flanks 6 of each tooth 602 so that the protruding portion 37a approaches an adjacent tooth 602 as a distance from a tip in facewidth directions decreases.

In the plastic molded gear 601, the thin portion 37 has a cut-out portion 37b which is obliquely formed from a tip-side root portion toward a root side, and one end face 38 in facewidth directions is open to a tooth crest 7.

The amount of protrusion of the protruding portion 37a from the tooth flank 6 toward an adjacent tooth 602 gradually increases as a distance from a tip in facewidth directions decreases. The amount of protrusion is so set as to be capable of absorbing at least backlash which is set between the gear 601 and a companion gear meshing with the gear 601.

In the plastic molded gear 601 with such a construction, the protruding portion 37a can absorb backlash, and the protruding portion 37a elastically contacts the tooth flank of the companion gear. Therefore, if the companion gear remains rotating due to inertia after the gear 601 stops rotating, the protruding portion 37a is elastically deformed to absorb the rotational energy of the companion gear to absorb shocks when the tooth flanks meshing with each other collide with each other. Thus, it is possible to reduce teeth knocking noises.

In the plastic molded gear 601 with such a construction, the protruding portion 37a is partially formed on the thin portion 37, and the flow stress of the protruding portion 37a (particularly, the flow stress on the bottom side) is smaller than that in each of the above described first preferred embodiments. Therefore, the protruding portion 37a is smoothly deformed, so that it is possible to reduce abnormal noises due to the deformation of the protruding portion 37a. In addition, in the plastic molded gear 601 in this preferred embodiment, the protruding portion 37a smoothly contacts the companion gear when the tooth 602 starts to mesh with the companion gear (in the case of a driven gear), and the disengaging operation of the protruding portion 37a from the tooth of the companion gear is smoothly carried out when the tooth 602 is disengaged from the companion gear (in the case of a driving gear). Therefore, the plastic molded gear 601 in this preferred embodiment can smoothly transmit power, and can reduce operation noises in cooperation with the function of preventing the occurrence of teeth knocking noises due to backlash.

Furthermore, the thin portion 37 and the protruding portion 37a may be also formed on the other end face in facewidth directions. That is, the thin portion 37 and the protruding portion 37a may be formed on both end faces in facewidth directions of the tooth 602.

In this preferred embodiment, the other tooth flank 12 of the tooth 602 serves as a main power transmission surface.

In this preferred embodiment, if the thin portion 37 is made of, e.g., polyacetal (POM), the thickness thereof is set to be in the range of from 0.1 (m) to 0.2 (m) with respect to module (m). Furthermore, the thickness of the thin portion 37 should not be limited to the above described thickness, but it may be a thickness of about 0.2 (m) to 0.4 (m).

Seventh Preferred Embodiment

FIG. 14 and FIGS. 15A through 15D show the shape of a tooth 702 of the seventh preferred embodiment of a plastic molded gear 701 according to the present invention as a modified example of the shape of the tooth 402 shown in FIGS. 10A and 10B. That is, as shown in FIG. 14 and FIGS. 15A through 15D, in the plastic molded gear 701 in this preferred embodiment, a thin portion 37 having a substantially constant thickness is continuously formed so as to extend along the periphery of the tooth 702 on the side of one of end faces 38 in facewidth directions, and a protruding portion 37a is formed so that the thin portion 37 on the side of a tooth flank 6 of each tooth 702 protrudes toward an adjacent tooth 602 as a distance from a tip in facewidth directions decreases. In addition, a tooth-crest near side portion 37c (a predetermined range from the tooth crest 7 toward the root of tooth) of the protruding portion 37a is formed so as to substantially have the same plane as that of the tooth flank 6, and the protruding portion 37a is formed so as to smoothly protrude from the tooth-root side end portion of the tooth-crest near side portion 37c.

If the tooth-crest near side portion 37c of the protruding portion 37a is thus formed so as to substantially have the same plane as that of the tooth flank 6, the protruding portion 37a smoothly contacts a tooth of a companion gear when the tooth 702 starts to mesh with the tooth of the companion gear (in the case of a driven gear), and the disengaging operation of the protruding portion 37a from the tooth of the companion gear is smoothly carried out when the tooth 702 is disengaged from the companion gear (in the case of a driving gear). Therefore, the plastic molded gear 701 in this preferred embodiment can smoothly transmit power, and can reduce operation noises.

The amount of protrusion of the protruding portion 37a from the tooth flank 6 toward an adjacent tooth 702 gradually increases as a distance from a tip in facewidth directions decreases. The amount of protrusion is so set as to be capable of absorbing at least backlash which is set between the gear 701 and the companion gear meshing with the gear 701.

In the plastic molded gear 701 with such a construction, the protruding portion 37a can absorb backlash, and the protruding portion 37a elastically contacts the tooth flank of the companion gear. Therefore, if the companion gear remains rotating due to inertia after the gear 701 stops rotating, the protruding portion 37a is elastically deformed to absorb the rotational energy of the companion gear to absorb shocks when the tooth flanks meshing with each other collide with each other. Thus, it is possible to reduce teeth knocking noises.

As described above, in the plastic molded gear 701 with such a construction, since the tooth-crest near side portion 37c of the protruding portion 37a is formed so as to substantially have the same plane as that of the tooth flank 6, the protruding portion 37a smoothly engages the tooth of the companion gear when the tooth 702 starts to mesh with the tooth of the companion gear (in the case of a driven gear), and the disengaging operation of the protruding portion 37a from the tooth of the companion gear is smoothly carried out when the tooth 702 is disengaged from the companion gear (in the case of a driving gear). Therefore, it is possible to reduce operation noises in cooperation with the function of preventing the occurrence of teeth knocking noises due to backlash.

Furthermore, the protruding portion 37a of the thin portion 37 may be also formed on the other end face in facewidth directions. That is, the protruding portion 37a of the thin portion 37 may be formed on both end faces in facewidth directions of the tooth 702.

In this preferred embodiment, the other tooth flank 12 of the tooth 702 serves as a main power transmission surface.

In this preferred embodiment, if the thin portion 37 is made of, e.g., polyacetal (POM), the thickness thereof is set to be in the range of from 0.1 (m) to 0.2 (m) with respect to module (m). Furthermore, the thickness of the thin portion 37 should not be limited to the above described thickness, but it may be a thickness of about 0.2 (m) to 0.4 (m).

Eighth Preferred Embodiment

Figure 16:
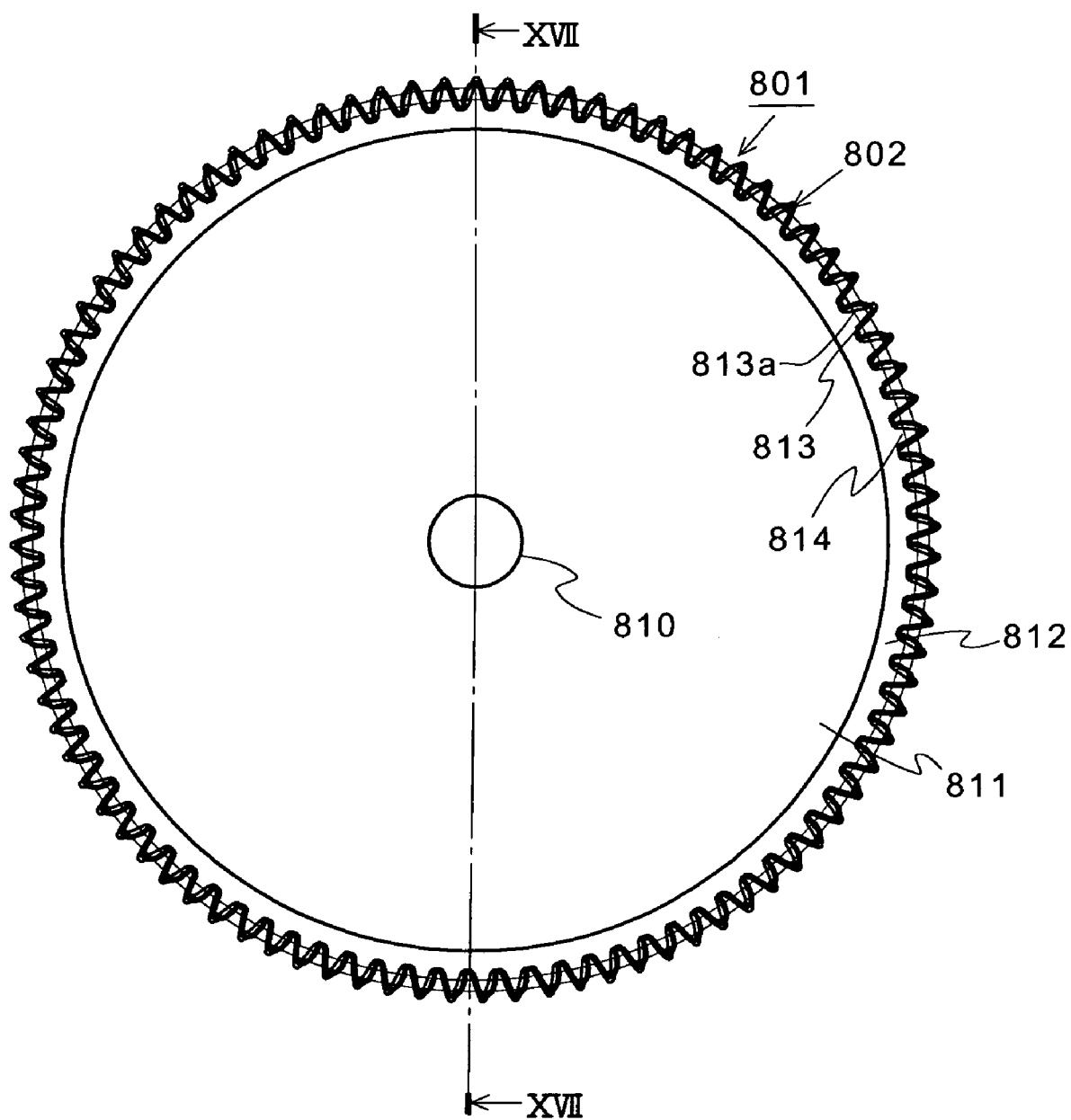
FIG. 16 is a front view of the eighth preferred embodiment of a plastic molded gear according to the present invention.
Figure 17:
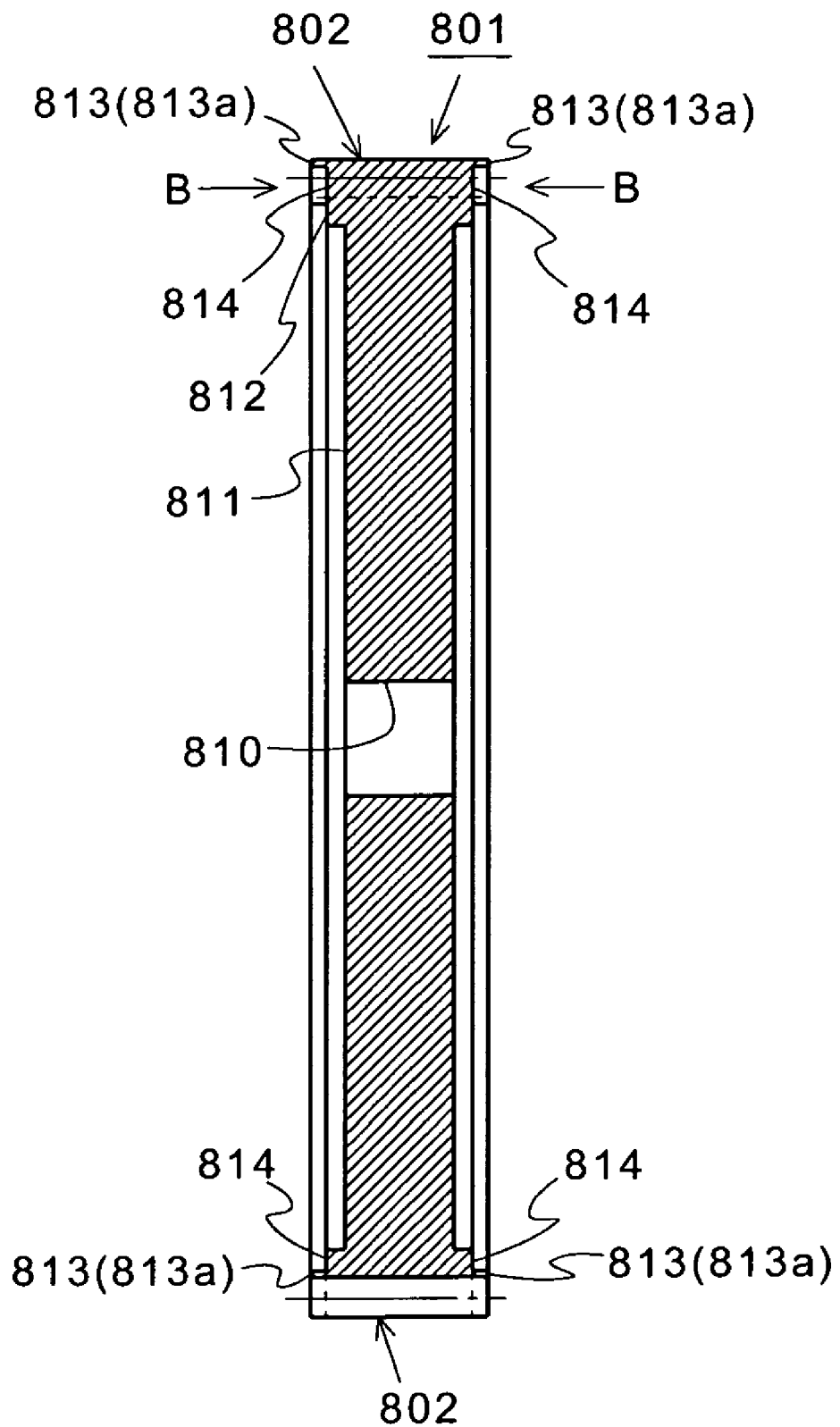
FIG. 17 is a sectional view taken along line XVII-XVII of FIG. 16.
Figure 18A:
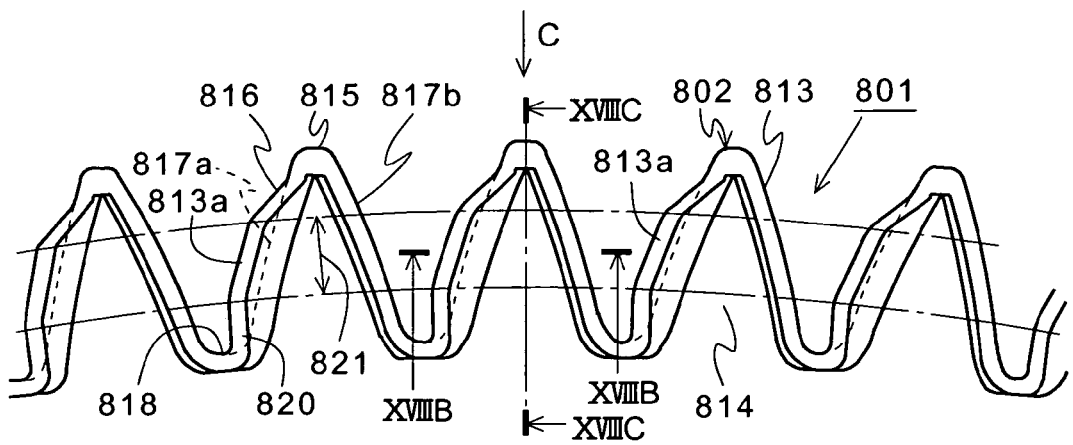
FIG. 18A is an enlarged view of teeth of the eighth preferred embodiment of a plastic molded gear according to the present invention, which is viewed in a direction of arrow B of FIG. 17.
Figure 18B:
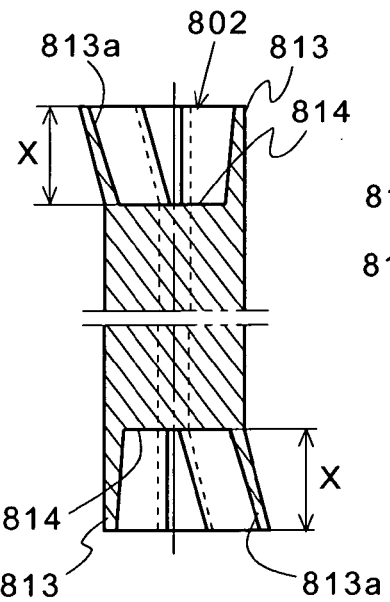
FIG. 18B is a sectional view of a tooth taken along line XVIIIB-XVIIIB of FIG. 18A.
Figure 18C:
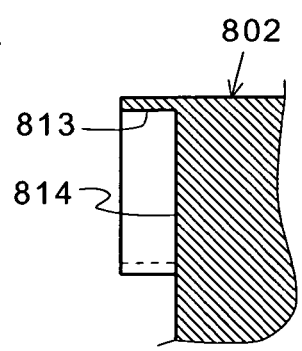
FIG. 18C is a sectional view of a tooth taken along line XVIIIC-XVIIIC of FIG. 18A.
Figure 18D:
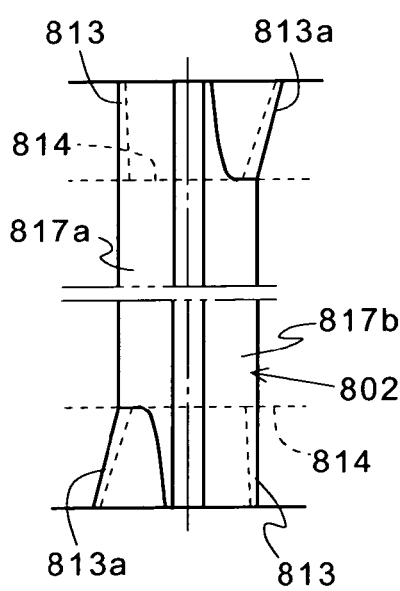
FIG. 18D is a plan view of a tooth which is viewed in a direction of arrow C of FIG. 18A.

FIGS. 16, 17 and 18A through 18D show the eight preferred embodiment of a plastic molded gear 801 according to the present invention. FIG. 16 is a front view of the plastic molded gear 801, and FIG. 17 is a sectional view taken along line XVII-XVII of FIG. 16. FIGS. 18A through 18D are enlarged illustrations for explaining a tooth 802 of the plastic molded gear 801. FIG. 18A is an enlarged view of the tooth 802 viewed in a direction of arrow B of FIG. 17, and FIG. 18B is a sectional view of the tooth 802 taken along line XVIIIB-XVIIIB of FIG. 18A. FIG. 18C is a sectional view of the tooth 802 taken along line XVIIIC-XVIIIC of FIG. 18A, and FIG. 18D is a plan view of the tooth 802 viewed in a direction of arrow C of FIG. 18A.

In the plastic molded gear 801 in this preferred embodiment, a rim 812 is formed on the outer periphery of a web 811 having an axial hole 810, and a plurality of teeth 802 are formed on the outer periphery of the rim 812. Protruding portions 813a are formed on both end portions in facewidth directions of each of the teeth 802 so as to protrude in reverse directions to each other. That is, the first protruding portion 813a is formed on one of end portions (one of end faces 814) in facewidth directions on the side of one tooth flank 817a of each tooth 802, and the second protruding portion 813a is formed on the other end portion (the other end face 814 opposite to the first protruding portion 813a in facewidth directions) on the side of the other tooth flank 817b of the tooth 802.

The protruding portion 813a is continuously formed by extending a thin portion 813a long the periphery of the tooth 802 on the side of one of end faces 814 in facewidth directions and by protruding the thin portion 813 toward an adjacent tooth 802 as a distance from a tip in facewidth directions decreases. The tooth-crest near side portion 816 (a predetermined range from the tooth crest 815 toward the root of tooth) of the protruding portion 813a is formed so as to substantially have the same plane as that of the tooth flank 817a, 817b, and the protruding portion 813a is formed so as to smoothly protrude from the tooth-root side end portion of the tooth-crest near side portion 816. The amount of protrusion of the bottom-land near side portion 820 (a predetermined range from a bottom land 818 toward a tooth crest 815) of the protruding portion 813a gradually increases as a distance from the tooth crest 815 decreases. The protruding portion 813a in this preferred embodiment is formed so that the amount of protrusion (the maximum amount of protrusion) is substantially constant in a predetermined range 821 in radial directions about a pitch diameter.

Thus, the tooth-crest near side portion 816 of the protruding portion 813a is thus formed so as to substantially have the same plane as that of the tooth flank 817a, 817b, and the amount of protrusion of the bottom-land near side portion 820 of the protruding portion 813a gradually decreases as a distance from the bottom land 818 decreases. Therefore, the protruding portion 813a smoothly contacts a tooth of a companion gear when the tooth 802 starts to mesh with the tooth of the companion gear, and the disengaging operation of the protruding portion 813a from the tooth of the companion gear is smoothly carried out when the tooth 802 is disengaged from the companion gear. Therefore, the plastic molded gear 801 in this preferred embodiment can more smoothly transmit power and more greatly reduce operation noises than that in the seventh preferred embodiment, since the shape of the bottom-land near side portion 820 of the protruding portion 813a is devised.

The amount of protrusion of the protruding portion 813a from the tooth flank 817a, 817b toward an adjacent tooth 802 gradually increases as a distance from a tip in facewidth directions decreases. The amount of protrusion is so set as to be capable of absorbing at least backlash which is set between the gear 801 and the companion gear meshing with the gear 801. In addition, the thickness of the protruding portion 813a gradually decreases from the root portion toward a tip in facewidth directions (see FIGS. 18A, 18B and 18D).

In the plastic molded gear 801 with such a construction, the protruding portion 813a can absorb backlash, and the protruding portion 813a elastically contacts the tooth flank of the companion gear. Therefore, if the companion gear remains rotating due to inertia after the gear 801 stops rotating, the protruding portion 813a is elastically deformed to absorb the rotational energy of the companion gear to absorb shocks when the tooth flanks meshing with each other collide with each other. Thus, it is possible to reduce teeth knocking noises. In addition, the thickness of the protruding portion 813a gradually decreases from the root portion toward a tip in facewidth directions. Therefore, when the protruding portion 813a is deformed, it can be gently deformed from the thin tip portion to gently apply flow stress to the companion gear, so that it is possible to facilitate the meshing of gears with each other.

As described above, in the plastic molded gear 801 with such a construction, the amount of protrusion of the tooth-crest near side portion 816 of the protruding portion 813a gradually decreases toward the tooth crest 815, and the amount of protrusion of the bottom-land near side portion 820 of the protruding portion 813a gradually decreases toward the bottom land 818. Therefore, when the tooth 802 starts to mesh with the tooth of the companion gear and when the tooth 802 is disengaged from the tooth of the companion gear, the meshing and disengaging operations of the teeth 802 with and from each other are smoothly carried out, so that it is possible to effectively reduce operation noises in cooperation with the function of preventing the occurrence of teeth knocking noises due to backlash.

In this preferred embodiment, if the thin portion 813 is made of, e.g., polyacetal (POM), the thickness thereof is set to be in the range of from about 0.2 (m) to 0.4 (m) with respect to module (m).

Ninth Preferred Embodiment

Figure 19A:
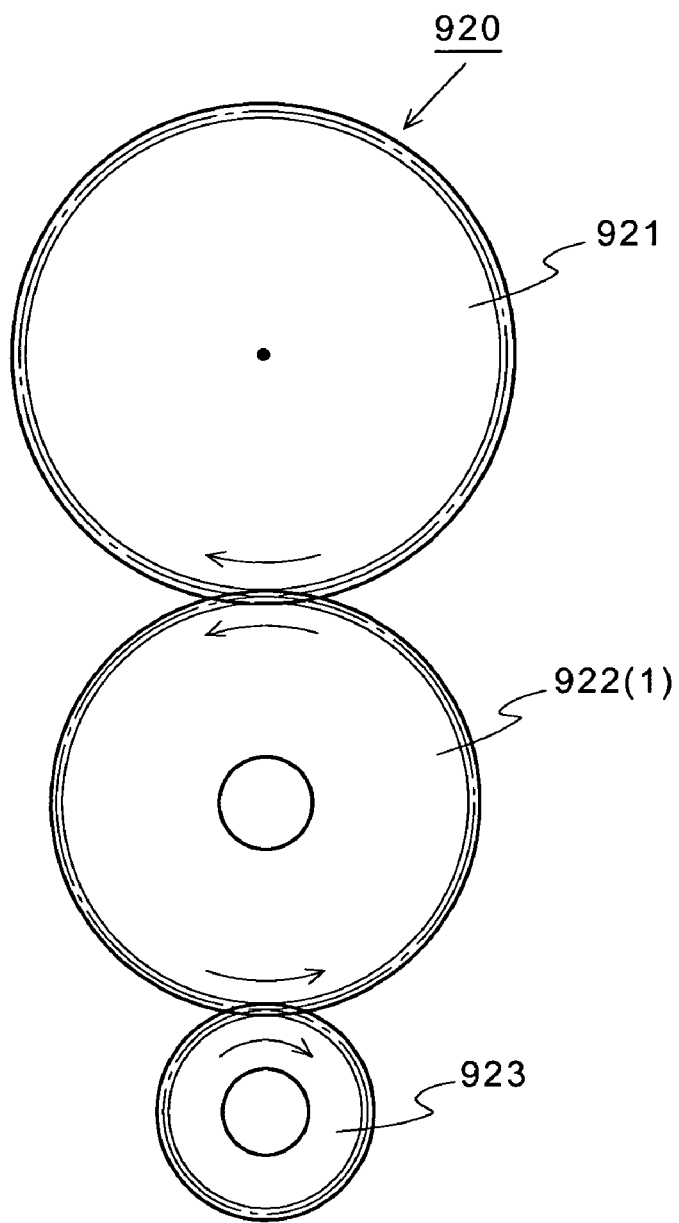
FIG. 19A is a front view of the ninth preferred embodiment of a gear train according to the present invention, which uses the plastic molded gear in the eighth preferred embodiment.
Figure 19B:
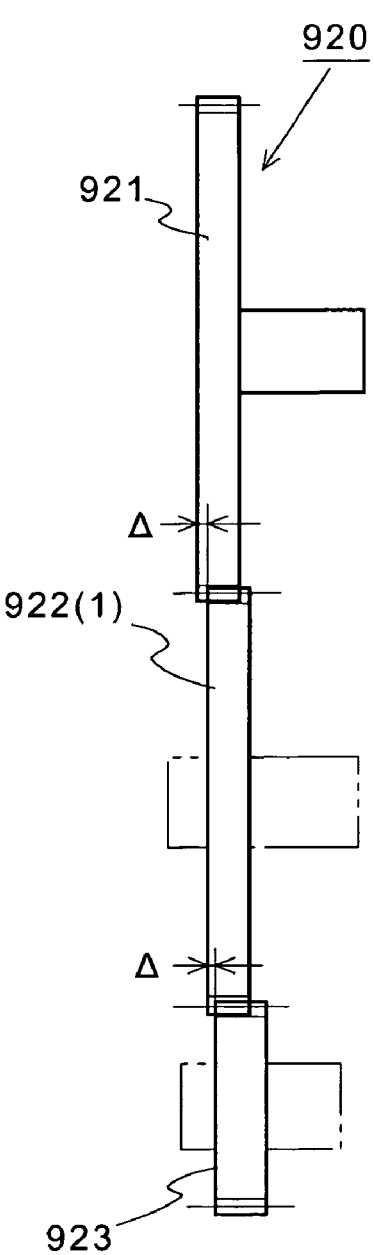
FIG. 19B is a side view of the gear train of FIG. 19A.
Figure 20A:
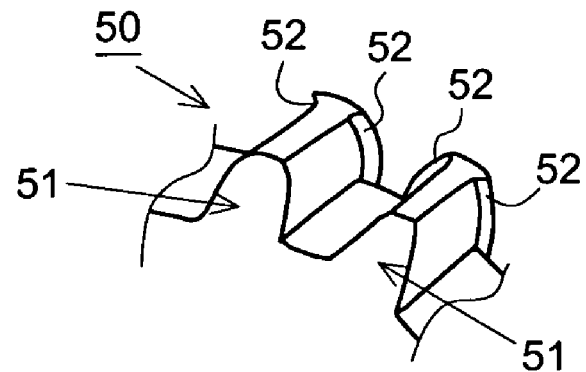
FIG. 20A is an enlarged perspective view of a first example of a conventional gear.
Figure 20B:
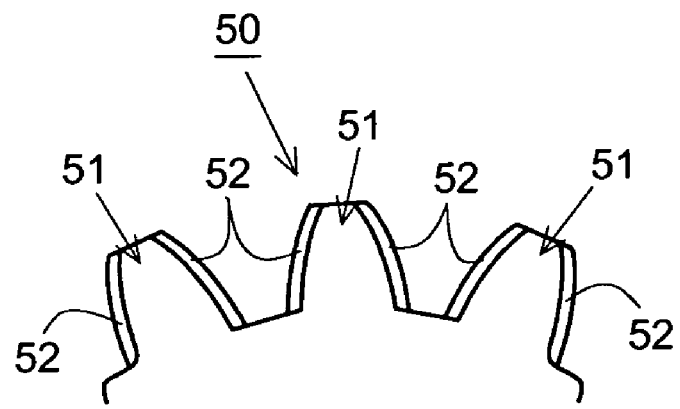
FIG. 20B is an enlarged front view of teeth of the gear of FIG. 20A.
Figure 21A:
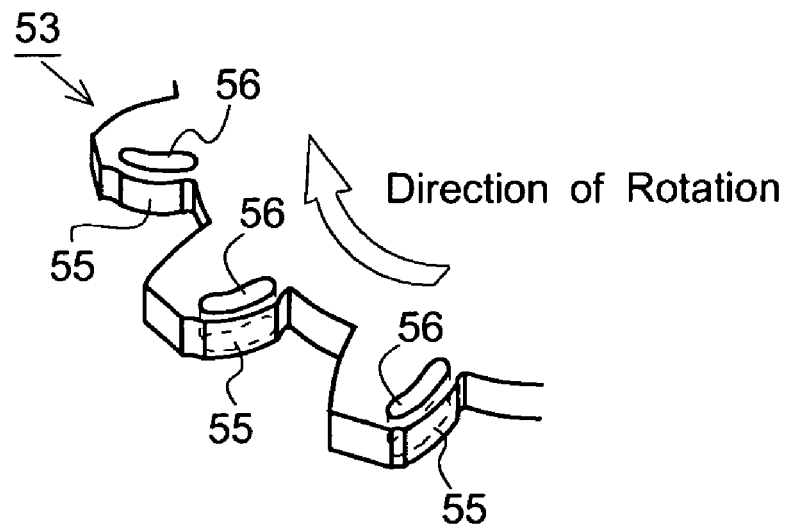
FIG. 21A is an enlarged perspective view of teeth of a second example of a conventional gear.
Figure 21B:
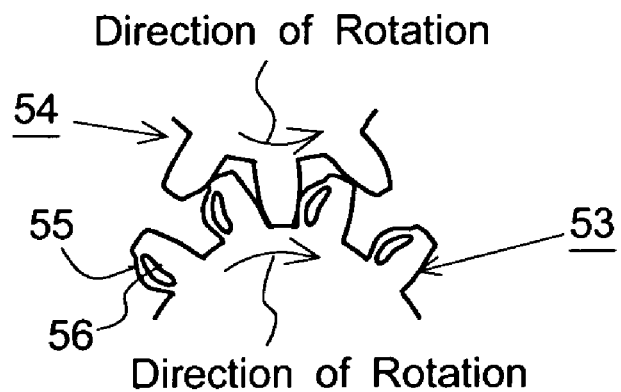
FIG. 21B is a view showing a state that the gear of FIG. 21A meshes with another gear.
Figure 22:
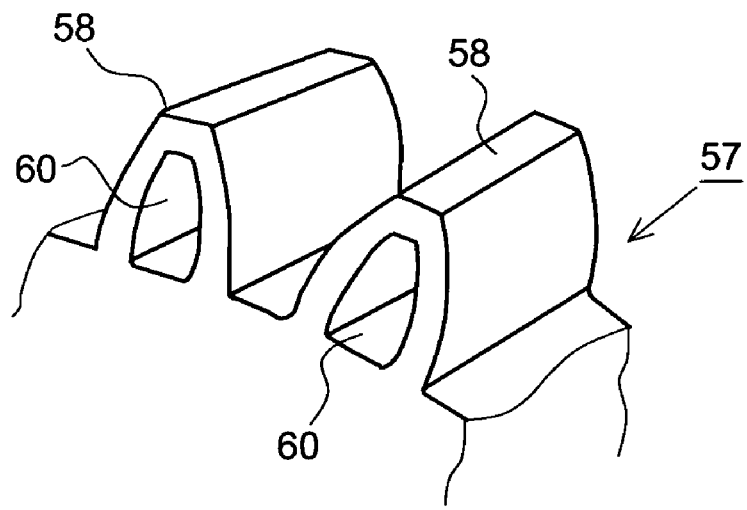
FIG. 22 is an enlarged perspective view of teeth of a third example of a conventional gear.
Figure 23:
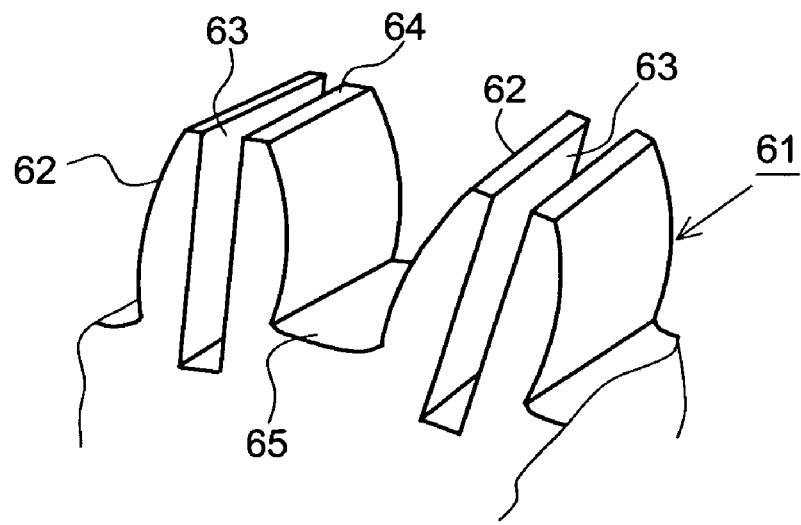
FIG. 23 is an enlarged perspective view of teeth of a fourth example of a conventional gear.
Figure 24:
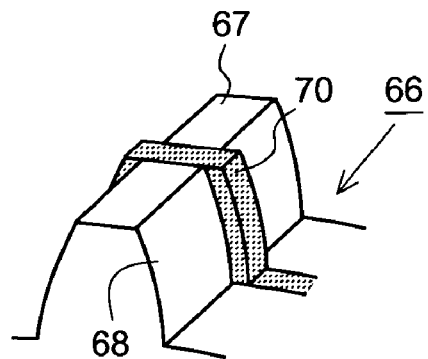
FIG. 24 is an enlarged perspective view of a tooth of a fifth example of a conventional gear.
Figure 25:
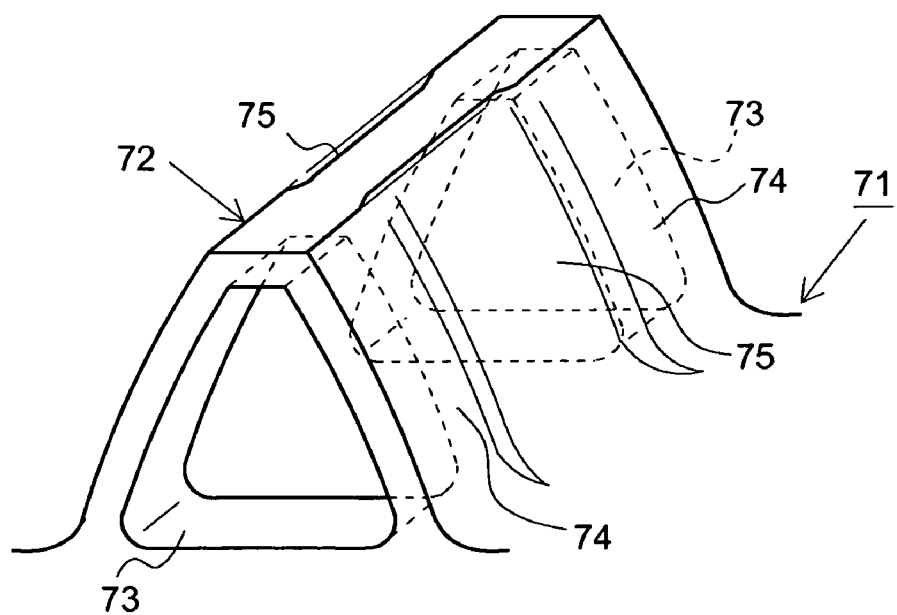
FIG. 25 is an enlarged perspective view of a tooth of a sixth example of a conventional gear.

FIG. 19A is a front view of a gear train 920 using a plastic molded gear according to the present invention, and FIG. 19B is a side view of the gear train 920.

The gear train 920 shown in FIGS. 19A and 19B comprises a driving gear 921 driven by a motor (not shown), an idle gear (an idler gear) 922 meshing with the driving gear 921, and a driven gear 923 meshing with the idle gear 922. As the idle gear 922, the plastic molded gear 801 in the above described eighth preferred embodiment is used.

As shown in FIG. 19B, in the gear train 920, the idle gear 922 is slightly deviated from the driving gear 921, which rotates clockwise (see FIG. 91A), by Δ to the right in the figure, and the driven gear 923 is slightly deviated from the idle gear 922 by Δ to the right in the figure.

That is, the protruding portion 813a on the side of one end in facewidth directions of the idle gear 922 (on the right side in facewidth directions in FIG. 17) does not mesh with the driving gear 921, and meshes with the driven gear 923. The protruding portion 813a on the side of the other end in facewidth directions of the idle gear 922 (on the left side in facewidth directions in FIG. 17) meshes with the driving gear 921, and does not mesh with the driven gear 923.

If the idle gear 922 according to the present invention is thus mounted so as to be slightly deviated from the driving gear 921 and driven gear 922 in facewidth directions, a tooth flank portion (a main power transmission surface, e.g., the other tooth flank 817b), on which the protruding portion 813a of the idle gear 922 is not formed, tightly contacts the driving-side tooth flank of the driving gear 921, and the protruding portion 813a of the idle gear 922 tightly contacts the non-driving-side tooth flank of the driving gear 921 to absorb backlash. In addition, a tooth flank portion (a main power transmission surface, e.g., one tooth flank 817a), on which the protruding portion 813a of the idle gear 922 is not formed, tightly contacts the driven-side tooth flank (a tooth flank to which power is mainly transmitted) of the driven gear 923, and the protruding portion 813a of the idle gear 922 tightly contacts the non-driven-side tooth flank (a tooth flank to which power is not mainly transmitted) of the driven gear 923 to absorb backlash.

Therefore, according to this preferred embodiment with such a construction, when the gear train 920 starts to rotate, rotation of the driving gear 921 is smoothly and precisely transmitted to the driven gear 923 via the idle gear 922, so that the gear train 920 can quietly transmit power.

If the gear train 920 with such a construction is used as a driving gear train for a paper feeder of a color printer, it is possible to precisely feed papers without irregular paper feeding, and it is difficult to cause printing defects, such as color deviation in a color image, so that it is possible to precisely and quietly carry out printing operations.

Furthermore, while the driving gear 921, the idle gear 922 and the driven gear 923 have been combined as an example of the gear train 920 in this preferred embodiment, the present invention should not be limited thereto, but the plastic molded gear 801 in the eighth preferred embodiment may be allowed to mesh with the driven gear 923 of FIG. 19 as an idler gear to form a gear train comprising a larger number of gears.

While the gear train 920 shown in FIGS. 19A and 19B has been illustrated so as to transmit rotation while decelerating, the present invention should not be limited thereto, but a gear train according to the present invention may be formed so as to transmit rotation while accelerating or so as to transmit rotation without accelerating and decelerating.

In this preferred embodiment, assuming that the dimension of the thin portion 903 (the protruding portion 813a) in facewidth directions (the amount of protrusion from the end face 814 in facewidth directions) is X, the deviation Δ of the idle gear 922 in facewidth directions from the driving gear 921, and the deviation Δ of the driven gear 923 in facewidth directions from the idle gear 922 are determined so that Δ≧X.

The plastic molded gear according to the present invention elastically contacts the tooth flank of the companion gear meshing with the protruding portion, to eliminate backlash. Therefore, even if the gear is used for a gear train for repeating rotation and stopping, it is possible to prevent the occurrence of teeth knocking noises due to backlash. In addition, since the plastic molded gear according to the present invention does not have the protruding portion on the tooth flank on the main power transmission side, it is possible to transmit rotation by the rigid tooth flank, so that it is possible to precisely transmit rotation. As a result, the plastic molded gear according to the present invention can be used for a gear train for precisely transmitting rotation, and it is possible to reduce operation noises and to precisely transmit rotation.

The plastic molded gear according to the present invention can be widely applied to a power transmission device required to precisely, quietly and smoothly transmit rotation, since the protruding portion formed on the opposite tooth flank to the main power transmission surface can contact the tooth flank of the companion gear meshing with the plastic molded gear to absorb backlash and to reduce teeth knocking noises. In particular, the plastic molded gear according to the present invention can be effectively used for an intermittent rotation transmission device for frequently repeating rotation and stopping, and can be widely applied to a gear train or power transmission device for image forming devices, such as ink jet printers, precision electrical equipments, automobiles and precision instruments.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A plastic molded gear comprising:
   a gear body;
   a plurality of teeth formed on an outer periphery of said gear body, each of said plurality of teeth having a pair of tooth flanks on both sides thereof;
   an elastically deformable protruding portion for eliminating backlash, said protruding portion being formed on one of said pair of tooth flanks so as to protrude from an end portion in facewidth directions of each of said plurality of teeth; and
   a slit or cavity for allowing said protruding portion to have the same plane as that of said one of said pair of tooth flanks when said protruding portion is elastically deformed so as to absorb backlash,
   wherein the other tooth flank of said pair of tooth flanks serves as a main power transmission surface.

2. A plastic molded gear comprising:
   a gear body;
   a plurality of teeth formed on an outer periphery of said gear body, each of said plurality of teeth having a pair of tooth flanks on both sides thereof;
   a pair of elastically deformable protruding portions for eliminating backlash, said pair of protruding portions being formed on both of said pair of tooth flanks so as to protrude from an end portion in facewidth directions of each of said plurality of teeth, respectively; and
   a cavity portion, formed in said end portion in facewidth directions, for allowing said pair of protruding portions to arrange a corresponding one of said pair of protruding portions on the same plane as that of a corresponding one of said pair of tooth flanks when said corresponding one of said pair of protruding portions is elastically deformed so as to absorb backlash.

3. A plastic molded gear as set forth in claim 2, wherein said cavity portion is open on the side of a tooth crest of each of said plurality of teeth.

4. A plastic molded gear comprising:
   a gear body;
   a plurality of teeth formed on an outer periphery of said gear body, each of said plurality of teeth having a pair of tooth flanks on both sides thereof;
   an elastically deformable protruding portion for eliminating backlash, said protruding portion being integrally formed on at least one end face of end portions in facewidth directions of each of said plurality of teeth so as to protrude from one of said pair of tooth flanks of each of said plurality of teeth toward an adjacent one of said plurality of teeth; and
   a slit or cavity for allowing said protruding portion to have the same plane as that of said one of said pair of tooth flanks when said protruding portion is elastically deformed so as to absorb backlash,
   wherein the other tooth flank of said pair of tooth flanks serves as a main power transmission surface.

5. A plastic molded gear comprising:
   a gear body;
   a plurality of teeth formed on an outer periphery of said gear body, each of said plurality of teeth having a pair of tooth flanks on both sides thereof;
   a first elastically deformable protruding portion for eliminating backlash, said first protruding portion being integrally formed on one end face of end portions in facewidth directions of each of said plurality of teeth so as to protrude from one of said pair of tooth flanks of each of said plurality of teeth toward an adjacent one of said plurality of teeth;
   a second elastically deformable protruding portion for eliminating backlash, said second protruding portion being integrally formed on the other end face of said end portions in facewidth directions of each of said plurality of teeth so as to protrude from the other tooth flank of said pair of tooth flanks of each of said plurality of teeth toward an adjacent one of said plurality of teeth; and
   a slit or cavity for allowing one of said first and second protruding portions to have the same plane as that of said one of said pair of tooth flanks or said other tooth flank when said one of said first and second protruding portions is elastically deformed so as to absorb backlash.

6. An intermittent rotation transmission device for intermittently transmitting rotation at one direction, wherein a gear train for intermittently transmitting rotation uses a plastic molded gear as set forth in any one of claims 1 through 5.

7. A gear train for transmitting rotation of a driving gear to a driven gear via an idle gear, said gear train comprising:

a driving gear;

a driven gear; and an idle gear for transmitting rotation of said driving gear to said driven gear, said idle gear being a plastic molded gear as set forth in claim 5, each of said first and second protruding portions of said plastic molded gear being arranged so as to face a tooth flank opposite to a tooth flank serving as a main power transmission surface of said driving gear when said driving gear is rotated in one direction, said plastic molded gear being shifted by a first predetermined dimension with respect to said driving gear in a facewidth direction, said driven gear being shifted by a second predetermined dimension with respect to said plastic molded gear in the same direction as said facewidth direction, and said first and second predetermined dimensions being equal to or greater than a dimension of said protruding portion in facewidth directions.

\* \* \* \* \*